Patented Mar. 18, 1941

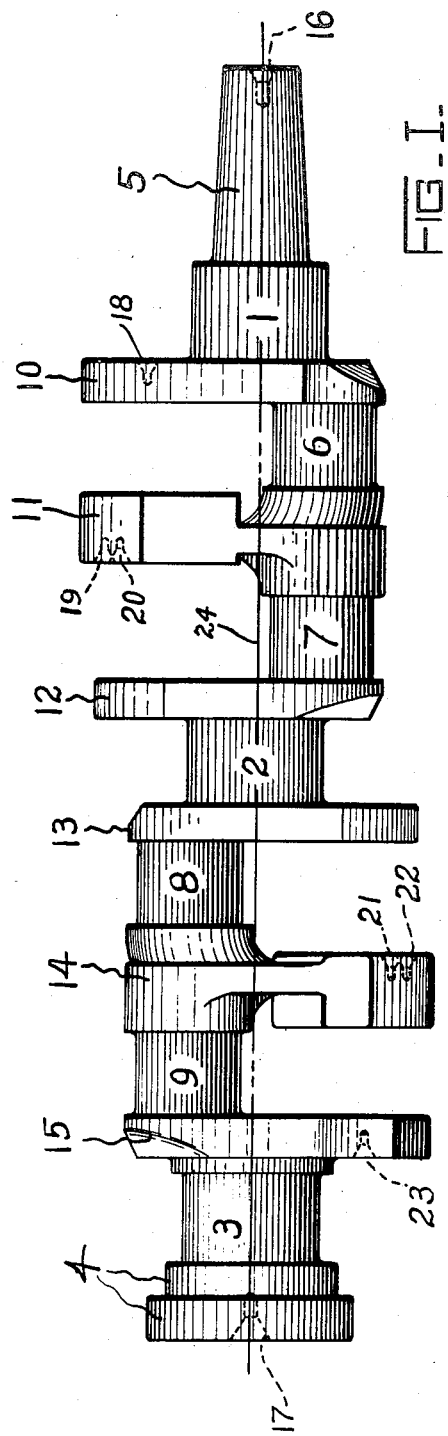
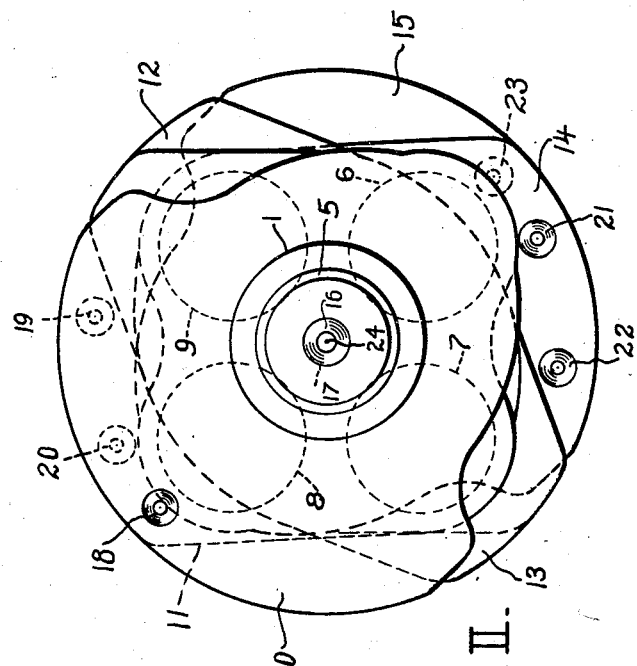

2,235,450

UNITED STATES PATENT OFFICE 2,235,450

CRANKSHAFT BLANK

Willard L. Groene, Cincinnati, Ohio, assignor to The R. K. Le Blond Machine Tool Company, Cincinnati, Ohio, a corporation of Delaware Application January 8, 1940, Serial No. 312,960

4 Claims. (Cl. 29—148)

This invention pertains to the preparation of crankshafts for chucking them in lathes for machining the various bearing portions of said crankshafts.

An object of this invention is to provide a crankshaft with locating surfaces on the cheeks or sides of the webs rather than on the periphery or outside diameter of the webs as has been heretofore done in previous practices of premachining crankshaft blanks preparatory to the turning of the line bearings and pin bearings of multithrow crankshafts.

Another object of this invention is to provide locating surfaces on the cheeks or sides of the webs of such a character that they may be machined by exerting feeding pressure on the work blank in a direction parallel to the axis of rotation of the crankshaft. By following this unique procedure there will be no bending or distorting of the crankshaft during the machining of these locating areas which would otherwise impair their accuracy very necessary in modern requirements of such locating surfaces, for the subsequent turning operations to be performed on the various bearing portions of the crankshaft.

Further features and advantages of this invention will appear from the following detailed description of the drawing in which:

Figure I shows a rough forged or cast crankshaft blank with the unique application of locating surfaces or holes in the sides of the webs of a crankshaft for use in chucking the crankshaft in subsequent machining operations on various portions of the crankshaft.

Figure II is a right hand end elevation of the crankshaft in Figure I showing the relative position of the various locating holes in the sides of the webs of the crankshaft of Figure I.

The crankshaft here shown for illustrative purposes of my novel method of premachining rough crankshaft blanks preparatory to turning its various bearing portions comprises the line bearings 1, 2 and 3 and flange end 4 and the stub end 5. The particular shaft here shown has four pin bearings 6, 7, 8, and 9 which are interconnected with each other and with the respective line bearings 1, 2, and 3 by the webs 10, 11, 12, 13, 14, and 15. The crankshaft is prepared for chucking in subsequent machining operations to be performed on these various bearing portions by machining the center holes 16 and 17 in the ends of the stub and flange ends 5 and 4 of the crankshaft and by providing a series of locating holes or equivalent surfaces (in this instance indicated as center holes) 18 in the cheeks or sides of web 10, 19 and 20 in web 11, 21 and 22 in web 14, 23 in web 15. These holes are accurately positioned relative to the axis of rotation 24 of the crankshaft so that when they cooperate with similarly accurately located plungers in a chucking device of a lathe for the subsequent machining operations, the crankshaft will be accurately positioned and rigidly held in proper position in said lathe during said turning operations on the bearing portions of the crankshaft.

Having thus fully set forth and described my invention, what I claim as new and desire to secure by United States Letters Patent is:

1. A blank for forming a multi-throw crankshaft comprising line bearing portions and pin bearing portions interconnected by rough irregular webs, having conical center holes prepared in the ends of said blank to define the main axis of rotation of said crankshaft and conical locating holes in the cheeks of the webs of said blank, the axes of said locating holes being parallel to said main axis of rotation of said crankshaft and spaced at predetermined radial distances from said main axis.

2. A crankshaft blank, comprising line bearing and pin bearing portions interconnected by rough irregular webs, prepared for chucking in a machine tool in that its end portions are prepared with center holes defining the main axis of rotation of said crankshaft and the cheeks of its webs are prepared with conical locating holes, the axes of which locating holes are parallel to said main axis of rotation of said crankshaft and spaced at predetermined radial distances from said main axis.

3. A blank for forming a multi-throw crankshaft comprising line bearing portions and pin bearing portions interconnected by rough irregular webs, having conical center holes prepared in the ends of said blank to define the main axis of rotation of said crankshaft, and circular locating holes in the cheeks of the webs of said blank, the axes of said locating holes being parallel to said main axis of rotation of said crankshaft and spaced at predetermined radial distances from said main axis.

4. A crankshaft blank, comprising line bearing and pin bearing portions interconnected by rough irregular webs, prepared for chucking in a machine tool in that its end portions are prepared with center holes defining the main axis of rotation of said crankshaft and the cheeks of its webs are prepared with circular locating holes, the axes of which locating holes are parallel to said main axis of rotation of said crankshaft and spaced at predetermined radial distances from said main axis.

WILLARD L. GROENE.